United States Patent Office 3,491,714
Patented Jan. 27, 1970

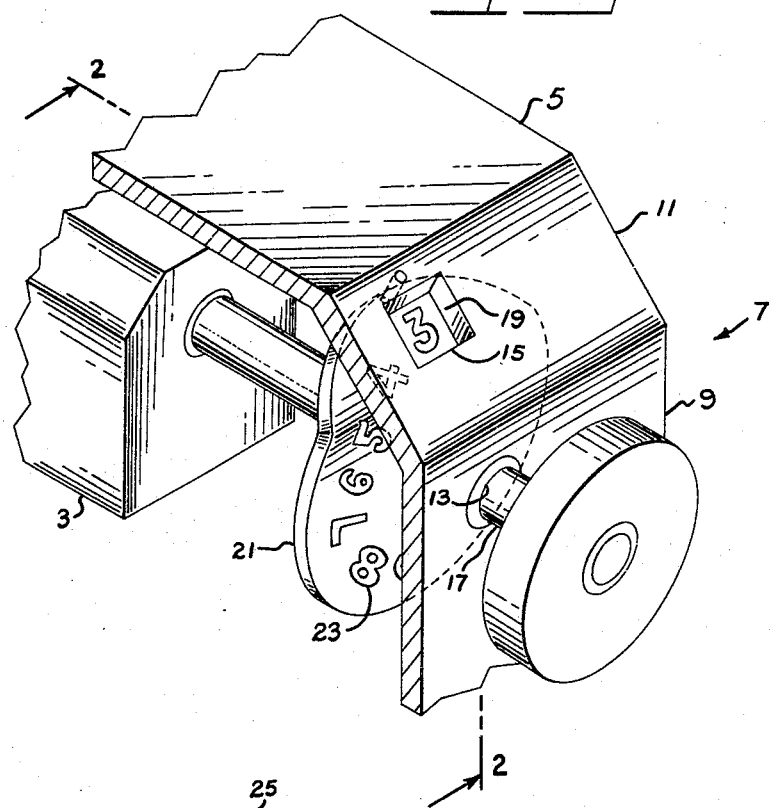
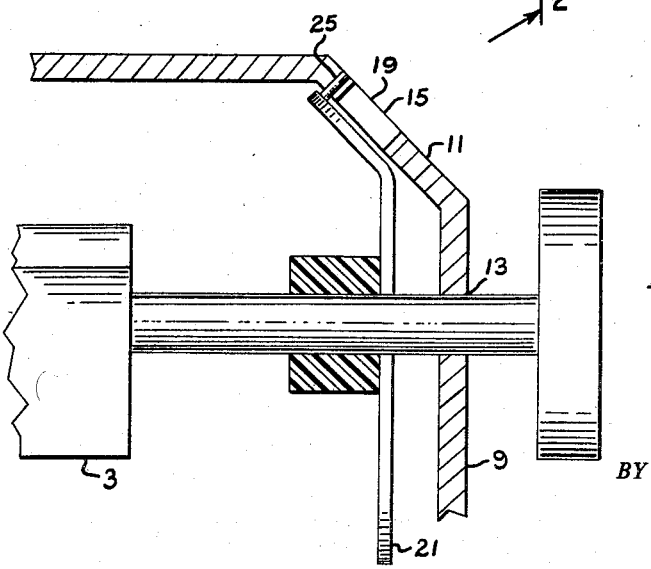

3,491,714
CHANNEL INDICATING ASSEMBLY
Harry Chetwode King, Lancaster, N.Y., assignor to Sylvania Electric Products Inc., a corporation of Delaware
Filed Sept. 10, 1968, Ser. No. 758,885
Int. Cl. H03j 1/02
U.S. Cl. 116—124.1                                     5 Claims

ABSTRACT OF THE DISCLOSURE

A channel indicating system for a television receiver includes a cabinet with a wall member having an apertured upstanding portion and an apertured angular portion with a rotatable tuner shaft extending through the aperture of the upstanding portion and a flexible plastic dial member with channel identifying indicia thereon affixed to the tuner shaft and frictionally engaging the angular portion to provide a flexure of the dial member and alignment of the indicia thereon with the aperture of the angular portion.

BACKGROUND OF THE INVENTION

Television receivers require some method for visually indicating the channel to which the receiver is tuned. Normally, the receiver includes a cabinet having a wall member with an escutcheon affixed to the wall member and serving to cover the operating mechanism of the receiver.

In the prior art, numerous types of channel indicating systems have been employed. For example, one well known type of channel indicating mechanism is in the form of a gear member affixed to a rotatable tuner shaft and a drum dial with channel indicating indicia appearing on the drum. Upon rotation of the shaft, the gear member drives the drum to locate an appropriate one of the channel indicator indicia in a viewing position. Other types of channel indicating systems include a disc-type dial with the rotatable tuning shaft extending through the center; a beveled disc affixed to a rotatable shaft with the channel indicating indicia located on the beveled portion of the disc; and a beveled gear system wherein one beveled gear is affixed to the rotatable tuner shaft and a cooperating beveled gear is affixed to a disc having channel identifying indicia thereon.

While each of the above-mentioned channel indicating systems have been popular at one time or another, it has been found that each leaves something to be desired for one or more reasons. For example, a gear and drum system is relatively expensive, a disc type dial is less expensive but undesirably requires more space for a given numeral size and often results in poor styling because of the necessary distance between the numerals and the central knob control. Moreover, the disc type dial is usually difficult to see when the viewer is in a standing position.

Also, the beveled disc type and the beveled gear systems are more readily observed when the viewer is in a standing position but are relatively expensive in both material and installation costs. Moreover, such system usually entail undesired tool costs or an inventory of relatively expensive components.

OBJECTS AND SUMMARY OF THE INVENTION

Therefore, it is an object of the present invention to provide an enhanced channel indicating system for a television receiver. Another object of the invention is to provide an improved channel indicating system for television receivers which is relatively simple and inexpensive. A further object of the invention is to enhance the styling of television receivers by providing an improved channel indicating system especially suitable for observation by a viewer in both standing and sitting positions.

These and other objects are achieved in one aspect of the invention by a channel indicating system for a television receiver wherein a wall member has an apertured upstanding portion and an apertured angular portion, a rotatable tuner shaft extends through the aperture of the upstanding portion, and a tuner flexible plastic dial member having channel identifying indicia thereon is fixed to the rotatable tuner shaft and frictionally engages the angular portion of the wall member to provide flexure of the dial member and alignment of the indicia thereon with the aperture of the angular portion.

BRIEF DESCRIPTION OF THE DRAWINGS

FIG. 1 is a perspective view of a television receiver illustrating a wall member and the viewing angle of one embodiment of a channel indicating system;

FIG. 2 is a sectional view, taken along the line 2—2 of the embodiment of FIG. 1.

DESCRIPTION OF THE PREFERRED EMBODIMENT

For a better understanding of the present invention, together with other and further objects, advantages and capabilities thereof, reference is made to the following disclosure and appended claims in connection with the accompanying drawings. Also, similar numbers are used to identify similar parts in both FIGS. 1 and 2 of the drawings.

Referring to FIGS. 1 and 2, a portion of a television receiver is employed to illustrate a channel indicating assembly. In this channel indicating assembly, a channel tuner 3 is enclosed by a wall member 5 having an integral upstanding portion 9 and an angular portion 11 and these upstanding and angular portions, 9 and 11 respectively, have an angle therebetween in the range of about 90° to 180° and, preferably, about 135°.

The upstanding portion 9 and the angular portion 11 each have an aperture, 13 and 15 respectively, extending therethrough. A tuning shaft member 17 extends through the aperture 13 of the upstanding portion 9 and is affixed to the channel tuner 3. Also, a transparent member 19, such as a glass plate for instance, is affixed to and substantially covers the aperture 15 of the angular portion 11.

Telescoped over the tuning shaft member 17 and disposed within the enclosure intermediate the channel tuner 3 and the wall member 5 is a flexible plastic dial member 21. Preferably, the dial member 21 includes a plurality of channel indicating indicia 23 thereon and is formed from a material such as the well known Mylar manufactured by the E. I. du Pont de Nemours Company.

The flexible dial member 21 substantially conforms to the contour of the integral upstanding and angular portions 9 and 11 of the wall member 5. In other words, the dial member 21 is flexed and caused to come into frictional engagement with the angular portion 11 of the wall member 5 whereupon the channel identifying indicia 23 comes into alignment with the aperture 15 of the angular portion 11. Thus, space conservation is achieved by the flexure of the dial member 21, styling and design is enhanced by the reduced distance between the tuning shaft 17 and the channel identifying indicia 23, and the channel identifying indicia is readily observed by a viewer from either a horizontal or vertical plane.

Additionally, the angular portion 11 of the wall member 5 has affixed to the inner surface thereof a protuberance 25. This protuberance 25 which may be of plastic or almost any other material for instance, frictionally engages the flexible plastic dial member 21.

As a result, the level of frictional resistance between the dial member 21 and the protuberance 25 is relatively low as compared with the resistance level between the dial member 21 and the surface of the angular portion 11.

Thus, a unique channel indicating assembly having numerous advantages over prior known systems has been provided. The assembly is not only economical of apparatus cost but also permits a notable reduction in space requirements which, in turn, enhances the styling and esthetic qualities of a television receiver. Most importantly, this relatively simple and inexpensive assembly permits observation of channel identifying indicia by an observer in both standing and sitting positions.

While there has been shown and described what is at present considered the preferred embodiments of the invention, it will be obvious to those skilled in the art that various changes and modifications may be made therein without departing from the invention as defined by the appended claims.

I claim:
1. In a television receiver, a channel indicating assembly comprising in combination:
   a cabinet containing a channel tuner and having a wall member with an integral apertured upstanding portion and an apertured angular portion;
   a rotatable tuner shaft extending through said apertured upstanding portion and attached to said channel tuner; and
   a flexible plastic dial member affixed to said tuner shaft and disposed within said cabinet, said dial member having channel indicating indicia thereon and frictionally engaging said apertured angular portion of said wall member whereby said dial member is flexed and said indicia thereon aligned with said apertured angular portion of said wall member.

2. The combination of claim 1 wherein said apertured upstanding portion and said apertured angular portion have an angle therebetween in the range of about 90–180 degrees.

3. The combination of claim 1 wherein said apertured angular portion includes a protuberance extending inwardly of said cabinet and frictionally engaging said dial member.

4. The combination of claim 1 wherein said flexible plastic dial member is mylar.

5. The combination of claim 1 including a transparent protective member affixed to said apertured angular portion covering said aperture therein.

References Cited

UNITED STATES PATENTS

| | | | |
|---|---|---|---|
| 1,777,500 | 10/1930 | McLaughlin | 116—124.1 |
| 1,929,667 | 10/1933 | Wilson | 116—124.4 |
| 2,470,582 | 5/1949 | Seasongood | 116—124 |
| 3,070,063 | 12/1962 | Lennon | 116—133 |

LOUIS J. CAPOZI, Primary Examiner

U.S. Cl. X.R.

116—133; 325—464; 334—86